Figure 6:
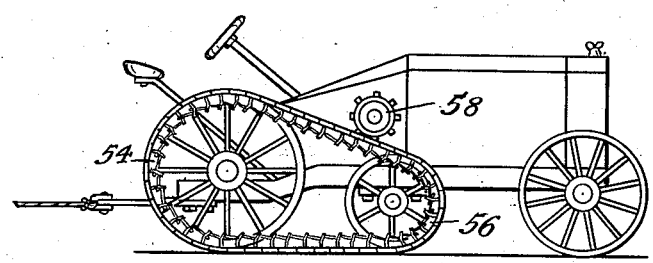

DE WITT NELSON.
LINK BELT.
APPLICATION FILED JAN. 27, 1919.
1,377,268.
Patented May 10, 1921.
3 SHEETS—SHEET 1.
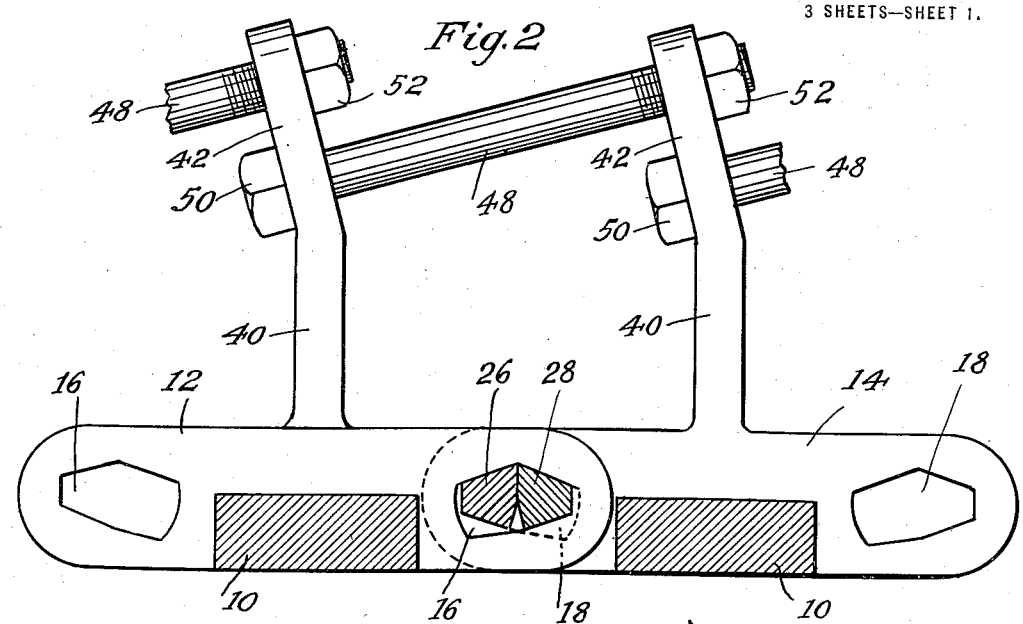
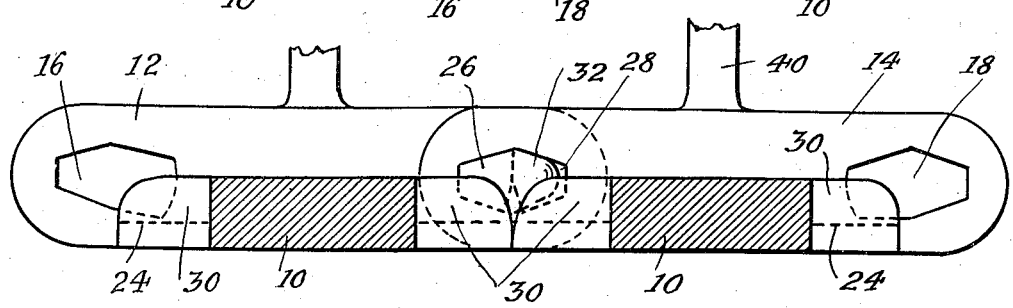
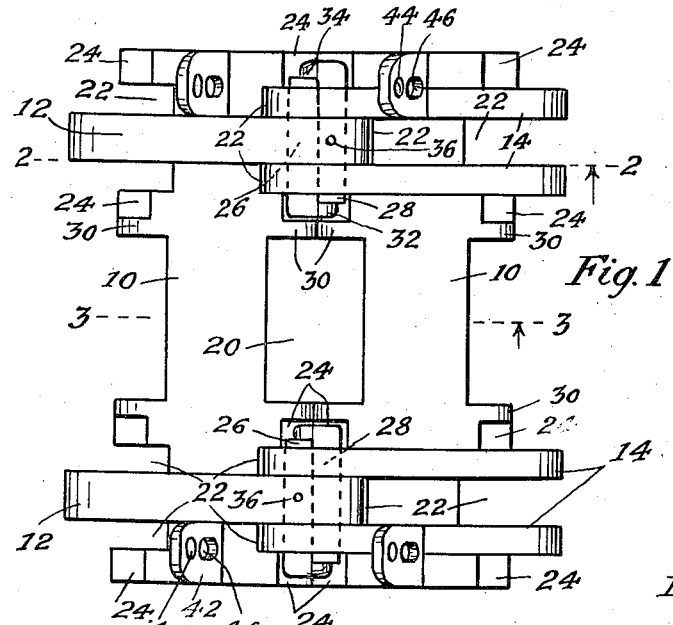
Inventor:
De Witt Nelson.
By Whiteley and Ruckman
his Attorneys.

DE WITT NELSON.
LINK BELT.
APPLICATION FILED JAN. 27, 1919.

1,377,268.

Patented May 10, 1921.
3 SHEETS—SHEET 2.

Inventor:
DeWitt Nelson
By Whiteley and Ruckman
his Attorneys.

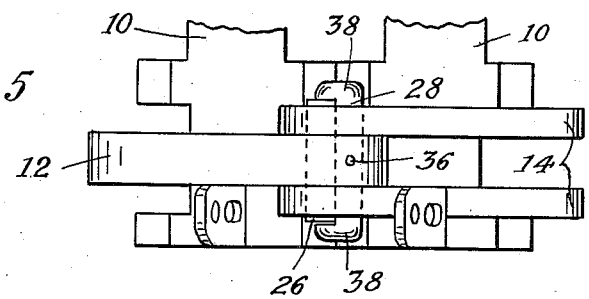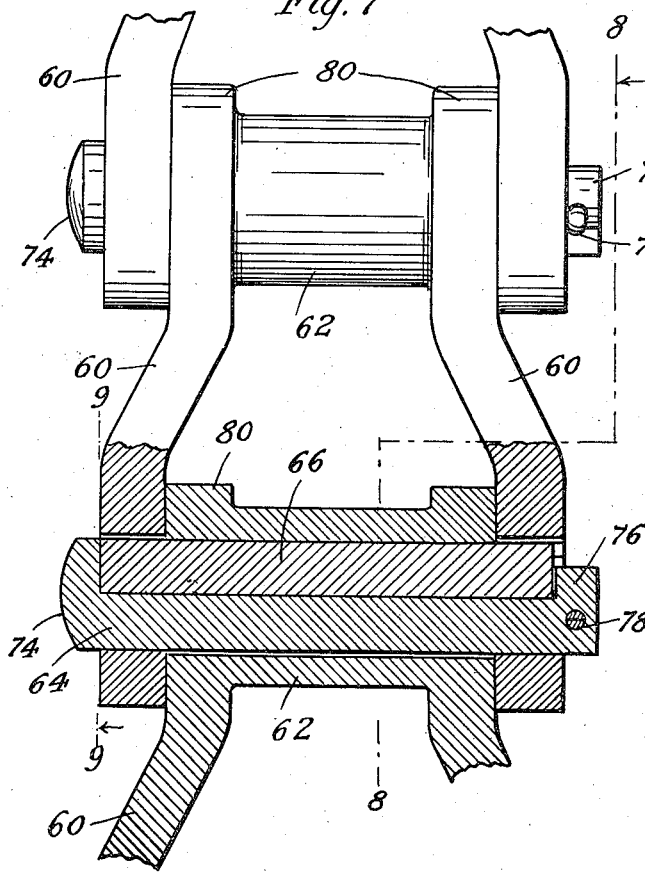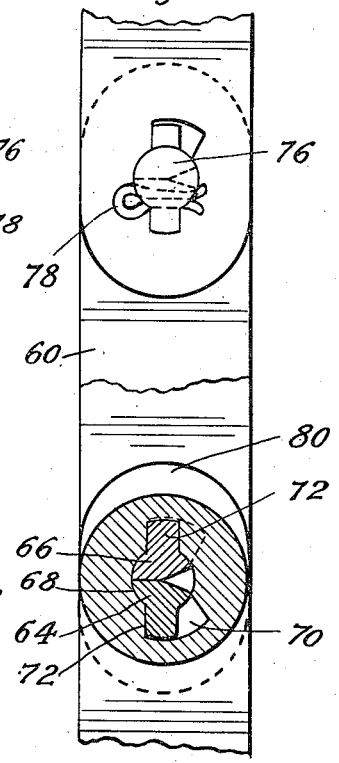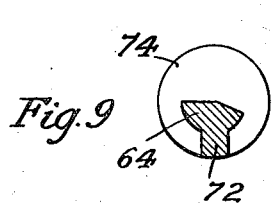

UNITED STATES PATENT OFFICE.

DE WITT NELSON, OF MINNEAPOLIS, MINNESOTA, ASSIGNOR TO THE HORTON MANUFACTURING COMPANY, OF MINNEAPOLIS, MINNESOTA, A CORPORATION.

LINK BELT.

1,377,268.          Specification of Letters Patent.     Patented May 10, 1921.

Application filed January 27, 1919. Serial No. 273,269.

*To all whom it may concern:*

Be it known that I, DE WITT NELSON, a citizen of the United States, residing at Minneapolis, in the county of Hennepin and State of Minnesota, have invented certain new and useful Improvements in Link Belts, of which the following is a specification.

My invention relates to link belts which may be used for traction belts of what is known as the traction belt type of traction engines, but my belt is also capable of use in various other places such as transmission belts or conveyer belts. As an illustration of the latter use may be mentioned its employment in connection with dredges. An object is to provide a belt constructed of a plurality of links jointed together in such manner that each pintle member of the joints consists of a pair of pins capable of rocking relatively to each other when the belt is deflected out of a straight line. Another object is to so construct the belt that the links may pivot in one direction with relation to the connecting pintles, but will be rigidly and adjustably held in the other direction with their outer surfaces lying in a plane. The belts as an entirety are driven by sprocket wheels the teeth of which engage in apertures between the respective links of the belt.

The full objects and advantages of my invention will appear in connection with the detailed description thereof and are particularly pointed out in the claim.

In the drawings, illustrating the application of my invention in different forms,—

Figure 4:
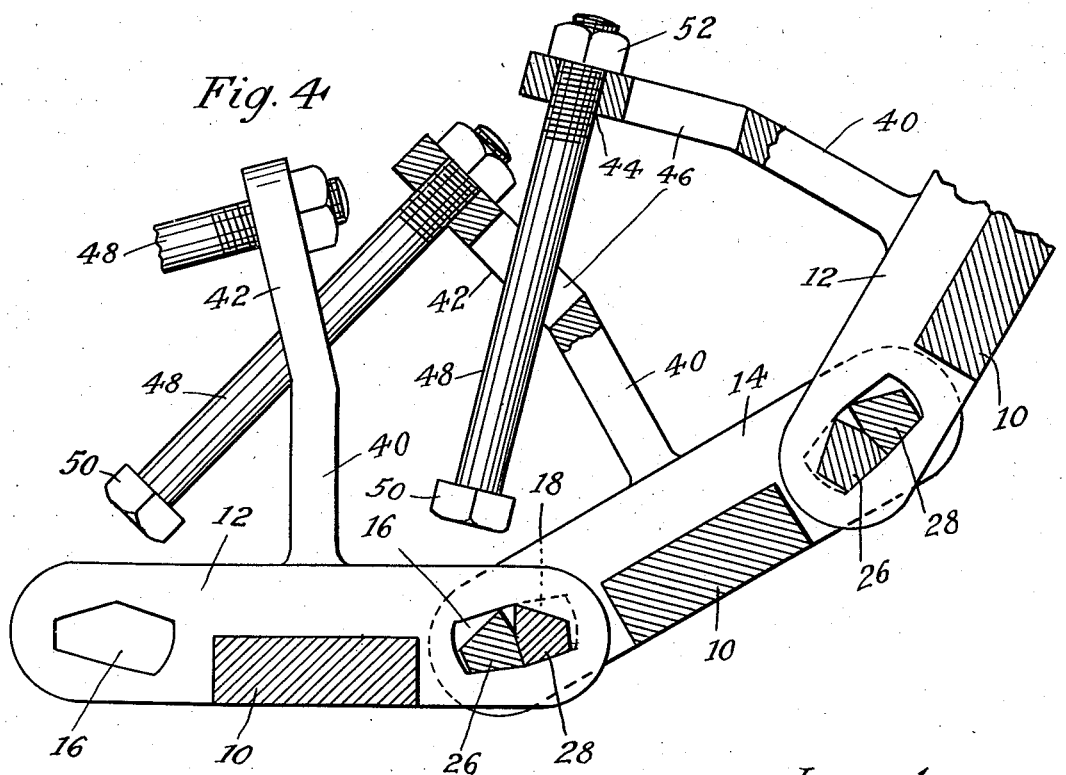

Figure 1 is a plan view of two links of a belt and the manner of connecting the links together. Fig. 2 is a section on line 2—2 of Fig. 1. Fig. 3 is a section on the line 3—3 of Fig. 1. Fig. 4 is a view similar to Fig. 2 showing the position assumed by the links as they are deflected in passing around a wheel. Fig. 5 is a plan view showing a modified form of the pins for joining the links. Fig. 6 is a side elevational view of a tractor showing my belt in use thereon as a traction belt. Fig. 7 is a sectional and plan view of a modified form of belt having links connected together by pintles operating upon the same principle as disclosed in the previous figures. Fig. 8 is an elevational sectional view on the line 8—8 of Fig. 7. Fig. 9 is a sectional view on the line 9—9 of Fig. 7 looking in the direction of the arrow.

The belt shown in Figs. 1 to 5 comprises a plurality of transverse slats 10 placed in longitudinal alinement with each other to form links which are connected together by pintles which will be described later. The pintles coöperate with lugs which may for convenience be arranged on the slats as follows. Each alternate slat is provided near each of its ends with a single raised longitudinally-extending lug member 12. Each of the intermediate slats is provided near each end with a pair of spaced raised longitudinally-extending lug members 14 between the ends of which the ends of the lugs 10 are adapted to fit. The ends of the lugs 12 and 14 are provided with openings 16 and 18, respectively, the walls of these openings being inclined so that the openings are wider at one side than at the other side, the sides being considered as being formed by the transverse walls. The wide portions of the openings of all of the lugs are always toward or nearer the slat to which the particular lug is attached. It will thus be apparent that the wide portions of the openings in the lugs 12 are adjacent the narrow portions of the openings in the lugs 14 and vice versa. The edges of the slats are cut away intermediate their ends to form openings 20, and the edges of the slats which are in alinement with the lugs 12 and 14 are cut away at 22 sufficiently to allow the lugs to interfit with each other. The slats are thus left with portions adjacent each side of the lugs 12 and 14 after the latter have been fitted together and these portions are reduced in thickness on their upper sides, as indicated at 24. When the slats lie in a common plane the surfaces 24 lie substantially in a plane with the lower walls of the wide portions of the openings 16 and 18, as is apparent from Fig. 3. In order to secure the slats together in a flexible manner, a pair of pins 26 and 28 extend through the openings 16 and 18 at each place where a lug 12 fits between a pair of lugs 14. These pins are beveled to fit the narrow portions of the openings 16 and 18, and the sides of the pins which are adjacent each other are beveled or rounded outwardly from the middle of these sides as shown in Figs. 2 and 4. When the belt lies flat, the pair of pins assume the position shown in Fig. 2 with a space between the lower beveled surfaces of the pair of pins. However, when the belt is deflected from a straight-line position the pins assume the position shown in Fig. 4 with a space between the upper beveled surfaces of the pair of pins. The reason for this will be readily understood from considering the lower joint in Fig. 4 in which it will be noticed that the right-hand pin 28 is held by the narrow portion of the opening in the lug 12, while the left-hand pin 26, which fits into the narrow portion of the openings in the lugs 14 is caused by the upward deflection of the lugs 14 to rock upon the pin 28, thus bringing the lower beveled surfaces of the two pins toward each other. The bending or deflection of the belt is thus permitted by a gradual rocking of the pin 26 upon the pin 28. If the belt is considered to move in the opposite direction, then the rocking movement occurs in reverse order. A convenient means for securing the pair of pins 26 and 28 in place in the openings of the lugs is shown in Figs. 1 and 3 in which the slats are provided with lugs 30 spaced from the inner sides of the inner lugs 14. The pins 26 are provided with heads 32 which engage the lugs 30 and are thus prevented from moving farther toward the other side of the belt. The pins 28 are provided with heads 34 which engage the outer ends of the pins 26, and the pins 28 are held in place by fasteners 36 extending through the lugs 12 into the pins 28 and driven securely into place. Fig. 5 shows a modified means of securing the pins in place. In this figure pins 28 are each provided with two heads 38 between which the pin 26 fits and the pin 28 is secured by a fastener 36 in the manner previously described.

In order to positively and rigidly prevent the belt from being deflected beyond a straight-line position the following construction is provided. The outer ends of the slats are provided with arms 40 extending rigidly at right angles thereto for a portion of their distance and then bent at an angle to form the inclined portion 42. Each inclined portion is provided with a screw-threaded hole 44 near its outer end and a slot 46 extending toward the right-angled portion. A bolt 48 having a head 50 is passed through each of the slots 46, and its screw-threaded end is turned into the threaded hole 44. A nut 52 serves to securely hold this end of the bolt in place. Referring to Fig. 2, it will be seen that the belt is rigidly supported and prevented from being deflected by upward pressure. Referring to Fig. 4, and again assuming that the belt is moving toward the right, it will be seen that as the belt is deflected while passing over the supporting wheels, the bolts 48 will slide in the slots 46, thus permitting the belt to be flexed. If the belt is traveling in the opposite direction, it is apparent that the bolts will slide in the other direction until their heads 50 engage the inclined portions 42, thus preventing further movement of the bolts.

Fig. 6 illustrates the application of my invention to a tractor for use as a traction belt. As here shown, the belt passes over the rear supporting wheel 54 and the auxiliary wheel 56. A sprocket 58 driven from the engine has its teeth engaged in the openings 20 of the belt and serves to drive the latter. It will be understood that one or more belts and driving sprockets may be employed.

Figs. 7, 8 and 9 illustrate a modified form of belt in which the links are connected together by pairs of pins operating upon the same principle as previously described. In this case each link comprises two side members 60 connected at one end by a hollow member 62 from which the members 60 extend and have their free ends deflected outwardly so as to pass outside of the member 62 of an adjacent link. The pintle for each joint comprises a pair of pins 64 and 66 which are passed through the opening in the hollow member 62, and also through similar openings in the side members 60. The opening is shaped if preferred so as to appear in cross-section as shown in Fig. 8, with the central portion 68 circular in outline but enlarged at opposite sides by outwardly-flaring recesses 60. A portion of the pins 64 and 66 are circular in cross-section to fit the portion 68 of the opening, and each is provided with an outwardly-extending wing 72 which lies in one of the recesses 70 but is narrower than this recess. The adjacent contacting sides of the pins are provided with beveled or rounded surfaces whereby the same easy rocking movement of one pin upon the other is obtained in a manner similar to that previously described when the belt is deflected out of a straight-line position. In order to secure the pairs of pins in place, the pin 64 is provided with a circular head 74 upon one end and a head 76 upon the other end shaped so as to pass through the opening in the hollow member 62. The pins are placed together in assembled position and the end on which the head 76 occurs is passed through the member 62, the head 74 engaging one of the side members 60 when the proper position is reached. A cotter pin 78 is then passed through the head 76 and the pins of the pintle will then be held securely from endwise movement. The belt may be driven by a sprocket wheel having teeth engaging between members 62, and the side members 60 may be provided with inward extensions 80 in order that the sprocket teeth may properly engage the belt. This form of my invention may be used either with or without the supporting members 40 and coöperating bolts 48 previously described, it being obvious that these parts may be readily applied to the side members 60.

The operation and advantages of my invention will be readily understood from the foregoing description. The provision of the pairs of pins so constructed and arranged that one pin rocks upon the other pin of the pair when the belt is deflected from a straight line, as is necessary in cases of endless belts, is accompanied by the following advantages. The amount of friction and wear is much less than is the case where the customary single pintle is employed, thus insuring longer service for the belt and resulting in marked economy of operation on account of the friction being reduced to a minimum.

I claim:

A belt comprising a plurality of links, pairs of coöperating pins both of which have their adjacent sides beveled, each of said links being connected to the adjacent link by a pair of said pins which rock upon said beveled sides when said belt is deflected either out of or into straight line position, and heads on the ends of said pins for holding them in position.

In testimony whereof I hereunto affix my signature.

DE WITT NELSON.